(12) United States Patent
Drevö et al.

(10) Patent No.: US 11,778,550 B2
(45) Date of Patent: *Oct. 3, 2023

(54) METHODS AND APPARATUS RELATING TO INACTIVE MODE IN A WIRELESS COMMUNICATIONS NETWORK

(71) Applicant: Telefonaktiebolaget LM Ericsson (publ), Stockholm (SE)

(72) Inventors: Markus Drevö, Linköping (SE); Håkan Axelsson, Linköping (SE); Stefan Johansson, Linköping (SE); Paul Schliwa-Bertling, Ljungsbro (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 70 days.

This patent is subject to a terminal disclaimer.

(21) Appl. No.: 17/225,207

(22) Filed: Apr. 8, 2021

(65) Prior Publication Data

US 2021/0227462 A1 Jul. 22, 2021

Related U.S. Application Data

(63) Continuation of application No. 16/472,601, filed as application No. PCT/SE2017/051175 on Nov. 27, 2017, now Pat. No. 11,006,359.

(Continued)

(51) Int. Cl.
  *H04W 56/00* (2009.01)
  *H04W 52/02* (2009.01)
  *H04W 76/15* (2018.01)
(52) U.S. Cl.
  CPC ....... *H04W 52/0212* (2013.01); *H04W 76/15* (2018.02)

(58) Field of Classification Search
  CPC .................. H04W 52/0212; H04W 76/15
  (Continued)

(56) References Cited

U.S. PATENT DOCUMENTS 9,319,856 B1 * 4/2016 Riggs ............... H04N 21/64753
2006/0056361 A1 3/2006 Jiang et al.
(Continued)

FOREIGN PATENT DOCUMENTS

WO 2015165120 A1 11/2015
WO 2016071311 A1 5/2016

OTHER PUBLICATIONS

3GPP, "3rd Generation Partnership Project; Technical Specification Group Services and System Aspects; Study on Architecture for Next Generation System (Release 14) The present", 3GPP TR 23.799 V2.0.0, Nov. 2016, pp. 1-523.

(Continued)

*Primary Examiner* — Sai Ming Chan
(74) *Attorney, Agent, or Firm* — Christopher & Weisberg, P.A.

(57) ABSTRACT

The disclosure provides methods in a network node for a telecommunications network. In one method, the network node operates as a primary network node for a wireless terminal configured with dual connectivity, and the method comprises: receiving a message indicating that a secondary network node, which provides user plane connectivity for the wireless terminal, has no data to transmit to the wireless terminal; and based at least in part on the received message, configuring the wireless terminal in an inactive mode.

11 Claims, 12 Drawing Sheets

Related U.S. Application Data

(60) Provisional application No. 62/438,606, filed on Dec. 23, 2016.

(58) Field of Classification Search
USPC .......................................................... 370/311
See application file for complete search history.

(56) References Cited

U.S. PATENT DOCUMENTS

| | | |
|---|---|---|
| 2015/0208366 A1 | 7/2015 | Papasakellariou et al. |
| 2016/0135247 A1* | 5/2016 | Ozturk .............. H04W 36/0094 455/436 |
| 2016/0212682 A1* | 7/2016 | Chung .................. H04W 12/06 |
| 2016/0285716 A1 | 9/2016 | Pelletier et al. |
| 2017/0064769 A1* | 3/2017 | Zhang .................. H04W 76/27 |
| 2019/0045398 A1* | 2/2019 | Chai ..................... H04W 24/08 |

OTHER PUBLICATIONS

3GPP, "3rd Generation Partnership Project; Technical Specification Group Services and System Aspects; IP Multimedia Subsystem (IMS); Stage 2 (Release 13)", 3GPP TS 23.228 V13.8.0, Dec. 2016, pp. 1-314.

Unknown, Author, "General issues in Light Connection", 3GPP TSG-RAN WG2 #95, R2-165070, Gothenburg, Sweden, Aug. 22-26, 2016, pp. 1-8.

Unknown, Author, "Introduction to stage 2 and scenarios for Light Connected Mode", 3GPP TSG-RAN WG3 Meeting #94, R3-162936, Reno, USA, Nov. 14-18, 2016, pp. 1-6.

Unknown, Author, "New RAN function to contact inactive mode UEs", 3GPP TSG RAN WG3 Meeting #93bis, R3-162248, Sophia Antipolis, France, Oct. 10-14, 2016, pp. 1-5.

Unknown, Author, "New WI proposal: Signalling reduction to enable light connection for LTE", 3GPP TSG RAN Meeting #71, RP-160540, Gothenburg, Sweden, Mar. 7-10, 2016, pp. 1-7.

\* cited by examiner

_METHODS AND APPARATUS RELATING TO INACTIVE MODE IN A WIRELESS COMMUNICATIONS NETWORK_

TECHNICAL FIELD

Embodiments of the present disclosure relate to methods and apparatus in a wireless communication network, and particularly to methods and apparatus for enabling a wireless terminal connected to the wireless communication network to enter an inactive mode.

BACKGROUND

A number of modern networks (such as E-UTRAN) support dual connectivity modes of operation, whereby a wireless terminal device is configured to utilize radio resources provided by two distinct schedulers, located in two base stations connected via a backhaul network.

FIG. 1 shows a network 10 that illustrates this concept. A wireless terminal 16 (e.g. a UE) is configured to communicate with first and second base stations (e.g. NodeBs, eNodeBs, gNodeBs, etc) 12, 14. The base stations 12, 14 are connected to each other via a backhaul network 18, which in turn provides a connection to a core network 20. The backhaul network 18 may provide a direct interface by which the base stations 12, 14 can communicate with each other (known in E-UTRAN as the X2 interface).

One of the base stations (which in this case is the first base station 12) is configured as a master base station, or master eNodeB (MeNB) 12, whereas the other base station (which in this case is the second base station 14) is configured as a secondary base station, or secondary eNodeB (SeNB) 14. The MeNB 12 establishes and controls a control plane radio bearer (also known as a signaling radio bearer, SRB) with the wireless terminal 16, and so handles control signaling between the wireless terminal 16 and the network 10. One or more data plane (or user plane) radio bearers, also known as data radio bearers (DRBs), are also established for the transfer of data between the wireless terminal 16 and the network. As will be shown below with respect to FIG. 2, one or more data plane radio bearers may be established between the MeNB 12 and the wireless terminal 16, between the SeNB 14 and the wireless terminal 16, or split between the MeNB 12 and the SeNB 14.

In one usual arrangement, the MeNB 12 is a macro base station and serves one or more corresponding macro-cells, whereas the SeNB 14 is a micro base station and serves one or more corresponding micro-cells. However, in other arrangements both base stations 12, 14 may be macro base stations serving macro cells, or micro base stations serving micro-cells. In future networks and access technologies, the base stations may utilize beam forming techniques to transmit signals via a plurality of directional beams.

In dual connectivity, the radio protocol architecture that a particular bearer uses depends on how the bearer is set up. Three bearer types currently exist: master cell group (MCG) bearer, secondary cell group (SCG) bearer and split bearer. A new bearer configuration called SCG split bearer is also being discussed in 3GPP. Those four bearer types are depicted in FIG. 2.

Radio resource control (RRC) for the connection is located in the MeNB 12 and, as noted above, SRBs are configured as MCG bearer type (and therefore only use the radio resources of the MeNB 12). User plane bearers can take any type.

The MCG bearer is received at the MeNB 12 from the core network 20, via the backhaul network 18 (which interface is known in LTE as the S1 interface). The bearer follows a direct path through the layers that are implemented in the MeNB 12, through packet data convergence protocol (PDCP), radio link control (RLC), and finally to media access control (MAC) before transmission to the wireless terminal 16. The SCG bearer follows a similar path, but through the SeNB 14.

The split bearer is also received at the MeNB 12 from the core network 20, via the backhaul network 18, and is processed initially using the PDCP protocol. However, the split bearer utilizes radio resources of both the MeNB 12 and the SeNB 14. Thus a split occurs and some of the data for the bearer is transmitted (e.g. via the backhaul network 18) from the MeNB 12 to the SeNB 14. The respective RLC and MAC functions of the MeNB 12 and the SeNB 14 process the data for transmission to the wireless terminal using their respective radio resources. The SCG split bearer, currently under discussion, is similar but originates in the SeNB 14 instead of the MeNB 12.

A further aspect of the disclosure relates to a new mode of connection currently under discussion at 3GPP denoted synonymously as "lightly connected mode", "inactive mode" or "dormant mode". In the following description, the term "inactive mode" is used; however, any of these terms may be used without departing from the scope of the disclosure herein.

More information concerning the inactive mode can be found in the 3GPP work item, "Signalling reduction to enable light connection for LTE" (RP-160540).

The inactive mode may be an RRC mode (or similar), and relate to a configuration in which signaling between the wireless terminal and the radio access network (e.g. base stations 12, 14) is reduced, so saving resources in the network and at the wireless terminal, but which is characterized by rapid and efficient recovery to an active mode (so keeping latency low).

For example, in one embodiment, the inactive mode is characterized by an active connection between the core network 20 and the radio access network (e.g. the base station by which the wireless terminal is served) in respect of the wireless terminal, such that the core network 20 considers that the wireless terminal is actively connected to the network 10, but an inactive connection between the wireless terminal and the radio access network (i.e. characterized by no, or substantially no, signaling between the wireless terminal and the base stations 12, 14).

Upon entry to the inactive mode, the radio access network may store a context of the wireless terminal (such as the wireless terminal's access stratum, AS, context) together with an identifier (also known as a resume ID) that enables the stored context to be recovered. The wireless terminal will not be in RRC CONNECTED mode, but may have a behavior similar to IDLE mode. However, from the core network point of view the wireless terminal is regarded as connected, such that the radio access network has the possibility to page the wireless terminal when data is available for transmission to it. When the wireless terminal resumes the connection it provides an identifier which enables the radio access network to identify the wireless terminal and retrieve the wireless terminal context. The wireless terminal context may be retrieved from another base station (e.g. via an interface such as the X2 or via another node such as an mobility management entity, MME). Thus the connection with the radio access network can be resumed rapidly and efficiently. One of the benefits of the inactive state is that it minimizes the signaling with the core network.

SUMMARY

One problem that has been identified by the inventors is that existing solutions for dual connectivity do not support inactive mode for any bearers that involve the SeNB 14 (e.g. SCG bearer or SCG split bearer). Therefore, before a wireless terminal enters the inactive mode, any SCG bearer or SCG split bearer needs to be released. This generates extra signaling towards the core network and also the wireless terminal since the bearers need to be released. Similarly, a wireless terminal which resumes from the inactive mode in the same eNB which configured it as inactive would require that the bearers are moved to SeNB before the optimal mode of operation is reached, which also requires signaling with the core network.

Embodiments of the disclosure provide methods and apparatus, such as radio access network nodes (e.g. eNodeBs or gNodeBs, or servers coupled to such nodes), that alleviate one of more of the problems identified above.

For example, one aspect of the disclosure provides a method in a network node for a telecommunications network, the network node operating as a primary network node for a wireless terminal configured with dual connectivity, the method comprising: receiving a message indicating that a secondary network node, which provides user plane connectivity for the wireless terminal, has no data to transmit to the wireless terminal; and based at least in part on the received message, configuring the wireless terminal in an inactive mode.

Another aspect of the disclosure provides a method in a network node for a telecommunications network, the network node operating as a secondary network node for a wireless terminal configured with dual connectivity, the method comprising: determining whether the secondary network node has data to transmit to the wireless terminal; and responsive to a determination that the secondary network node has no data to transmit to the wireless terminal, transmitting, to a primary network node providing control plane connectivity for the wireless terminal, a message indicating that the secondary network node has no data to transmit to the wireless terminal, to enable the wireless terminal to be configured in an inactive mode.

Another aspect of the disclosure provides a network node for a telecommunications network, the network node operating as a primary network node for a wireless terminal configured with dual connectivity, the network node being configured to: receive a message indicating that a secondary network node, which provides user plane connectivity for the wireless terminal, has no data to transmit to the wireless terminal; and, based at least in part on the received message, configure the wireless terminal in an inactive mode.

Another aspect of the disclosure provides a network node for a telecommunications network, the network node operating as a primary network node for a wireless terminal configured with dual connectivity, the network node comprising processing circuitry and a non-transitory computer-readable medium storing instructions which, when executed by the processing circuitry, cause the network node to: receive a message indicating that a secondary network node, which provides user plane connectivity for the wireless terminal, has no data to transmit to the wireless terminal; and based at least in part on the received message, configure the wireless terminal in an inactive mode.

Another aspect of the disclosure provides a network node for a telecommunications network, the network node operating as a primary network node for a wireless terminal configured with dual connectivity, the network node comprising: a first module configured to receive a message indicating that a secondary network node, which provides user plane connectivity for the wireless terminal, has no data to transmit to the wireless terminal; and a second module configured to, based at least in part on the received message, configure the wireless terminal in an inactive mode.

Another aspect of the disclosure provides a network node for a telecommunications network, the network node operating as a secondary network node for a wireless terminal configured with dual connectivity, the network node being configured to: determine whether the secondary network node has data to transmit to the wireless terminal; and, responsive to a determination that the secondary network node has no data to transmit to the wireless terminal, transmit, to a primary network node providing control plane connectivity for the wireless terminal, a message indicating that the secondary network node has no data to transmit to the wireless terminal, to enable the wireless terminal to be configured in an inactive mode.

Another aspect of the disclosure provides a network node for a telecommunications network, the network node operating as a secondary network node for a wireless terminal configured with dual connectivity, the network node comprising processing circuitry and a non-transitory computer-readable medium storing instructions which, when executed by the processing circuitry, cause the network node to: determine whether the secondary network node has data to transmit to the wireless terminal; and, responsive to a determination that the secondary network node has no data to transmit to the wireless terminal, transmit, to a primary network node providing control plane connectivity for the wireless terminal, a message indicating that the secondary network node has no data to transmit to the wireless terminal, to enable the wireless terminal to be configured in an inactive mode.

Another aspect of the disclosure provides a network node for a telecommunications network, the network node operating as a secondary network node for a wireless terminal configured with dual connectivity, the network node comprising: a first module configured to determine whether the secondary network node has data to transmit to the wireless terminal; and a second module configured to, responsive to a determination that the secondary network node has no data to transmit to the wireless terminal, transmit, to a primary network node providing control plane connectivity for the wireless terminal, a message indicating that the secondary network node has no data to transmit to the wireless terminal, to enable the wireless terminal to be configured in an inactive mode.

Note that the discussion below focuses on a technical solution for LTE; however, those skilled in the art will appreciate that it is also possible to apply the methods and apparatus described herein to other networks and access technologies, such as those networks intended to meet the requirements set out for the fifth generation (5G) of wireless systems, as defined by the Next Generation Mobile Networks Alliance. In other networks, nodes and interfaces may have different names (e.g. gNB instead of eNB, or XN interface instead of X2 interface).

DETAILED DESCRIPTION

Figure 1:
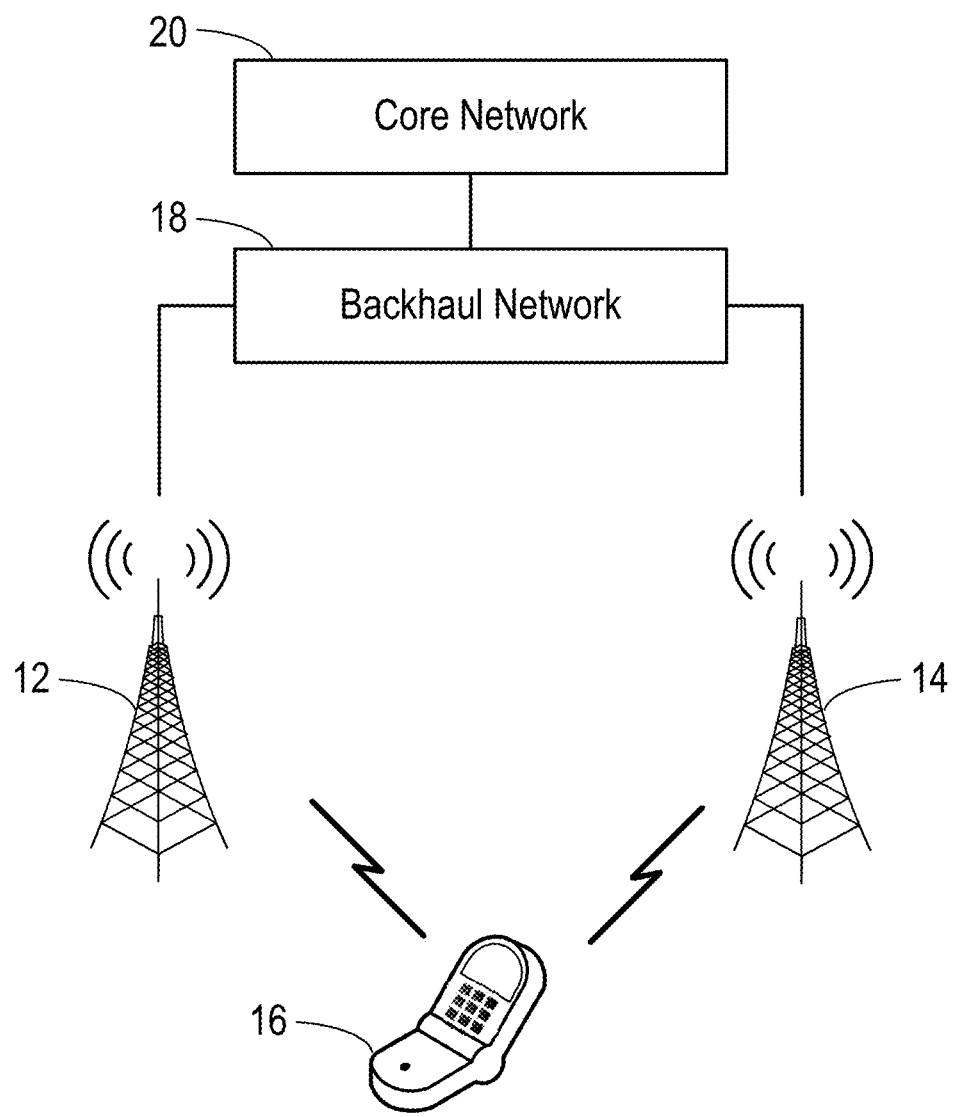
FIG. 1 shows a wireless communications network.

The following sets forth specific details, such as particular embodiments for purposes of explanation and not limitation. But it will be appreciated by one skilled in the art that other embodiments may be employed apart from these specific details. In some instances, detailed descriptions of well-known methods, nodes, interfaces, circuits, and devices are omitted so as not obscure the description with unnecessary detail. Those skilled in the art will appreciate that the functions described may be implemented in one or more nodes using hardware circuitry (e.g., analog and/or discrete logic gates interconnected to perform a specialized function, ASICs, PLAs, etc.) and/or using software programs and data in conjunction with one or more digital microprocessors or general purpose computers that are specially adapted to carry out the processing disclosed herein, based on the execution of such programs. Nodes that communicate using the air interface also have suitable radio communications circuitry. Moreover, the technology can additionally be considered to be embodied entirely within any form of computer-readable memory, such as solid-state memory, magnetic disk, or optical disk containing an appropriate set of computer instructions that would cause a processor to carry out the techniques described herein.

Hardware implementation may include or encompass, without limitation, digital signal processor (DSP) hardware, a reduced instruction set processor, hardware (e.g., digital or analog) circuitry including but not limited to application specific integrated circuit(s) (ASIC) and/or field programmable gate array(s) (FPGA(s)), and (where appropriate) state machines capable of performing such functions.

In terms of computer implementation, a computer is generally understood to comprise one or more processors, one or more processing modules or one or more controllers, and the terms computer, processor, processing module and controller may be employed interchangeably. When provided by a computer, processor, or controller, the functions may be provided by a single dedicated computer or processor or controller, by a single shared computer or processor or controller, or by a plurality of individual computers or processors or controllers, some of which may be shared or distributed. Moreover, the term "processor" or "controller" also refers to other hardware capable of performing such functions and/or executing software, such as the example hardware recited above.

Although the description is given for a wireless terminal, or user equipment (UE), it should be understood by the skilled in the art that "UE" is a non-limiting term comprising any mobile or wireless device, terminal or node equipped with a radio interface allowing for at least one of: transmitting signals in uplink (UL) and receiving and/or measuring signals in downlink (DL). A UE herein may comprise a UE (in its general sense) capable of operating or at least performing measurements in one or more frequencies, carrier frequencies, component carriers or frequency bands. It may be a "UE" operating in single- or multi-radio access technology (RAT) or multi-standard mode. As well as "UE", the terms "mobile station" ("MS"), "mobile device" and "terminal device" may be used interchangeably in the following description, and it will be appreciated that such a device does not necessarily have to be 'mobile' in the sense that it is carried by a user. Instead, the term "mobile device" encompasses any device that is capable of communicating with communication networks that operate according to one or more mobile communication standards, such as the Global System for Mobile communications, GSM, UMTS, Long-Term Evolution, LTE, IEEE 802.11 or 802.16, etc.

The description involves communication between a UE and a radio access network, which typically includes multiple radio access nodes. In the specific example given, the radio access nodes take the form of eNodeBs (eNBs), as defined by 3GPP, or gNodeBs (gNBs) as utilised in the future standards expected to meet the 5G requirements. However, it will be appreciated that the concepts described herein may involve any radio access nodes. Moreover, where the following description refers to steps taken in or by a radio access node, this also includes the possibility that some or all of the processing and/or decision making steps may be performed in a device that is physically separate from the radio antenna of the radio access node, but is logically connected thereto. Thus, where processing and/or decision making is carried out "in the cloud", the relevant processing device is considered to be part of the radio access node for these purposes.

For the purposes of illustration, the network 10 shown in FIG. 1 may be utilized to explain the principles of embodiments of the present disclosure. Thus, a wireless terminal 16 is configured with dual connectivity and connected to a MeNB (base station 12) and a SeNB (base station 14). A control plane radio bearer is established between the wireless terminal 16 and the MeNB 12, and implemented as an MCG bearer. One or more user plane radio bearers are established between the SeNB 14 and the wireless terminal 16, and may be implemented as SCG bearers or SCG split bearers (or a combination of the two if more than one bearer is established with the SeNB 14). One or more user plane radio bearers may also be established between the MeNB 12 and the wireless terminal 16 (as MCG bearers, MCG split bearers, or a combination thereof).

Figure 3:
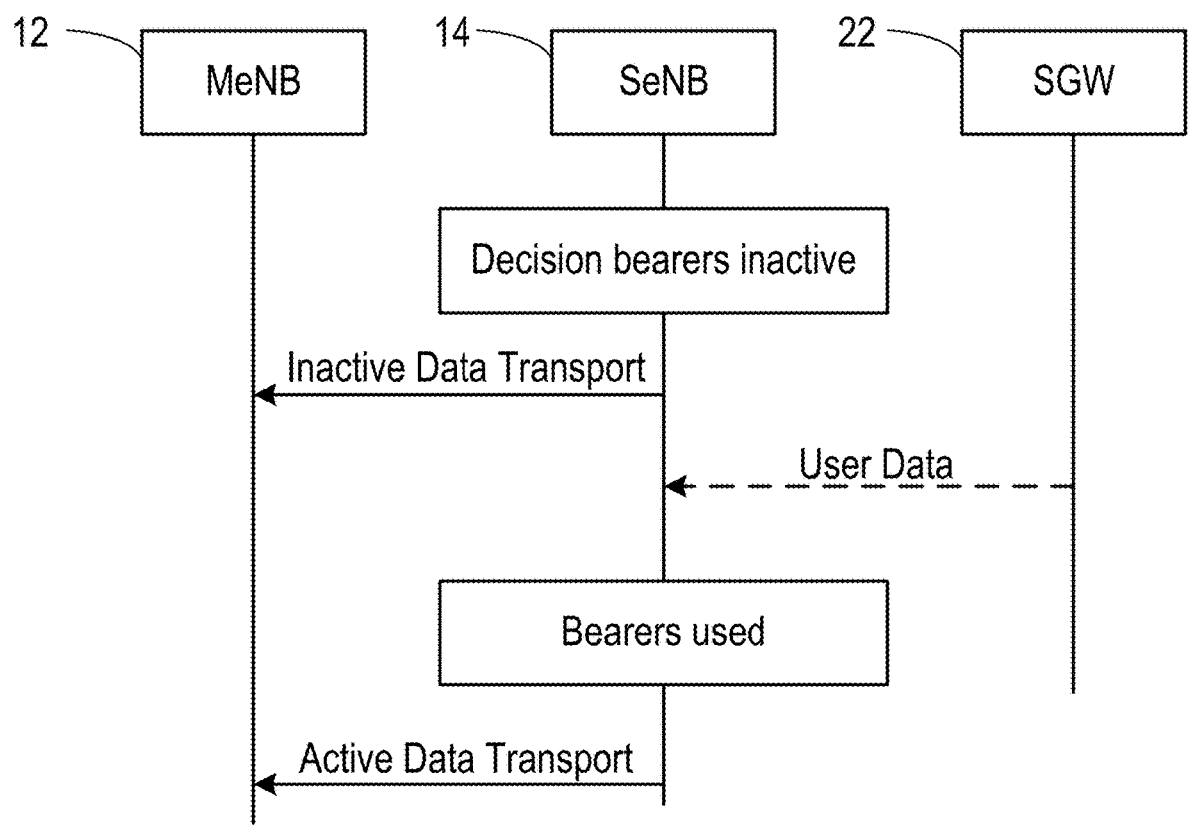
FIG. 3 is a signalling diagram showing signals according to embodiments of the disclosure.

FIG. 3 is a signalling diagram showing signals according to embodiments of the present disclosure. The diagram also illustrates signals from a serving gateway (SGW) 22, which is a node within the core network 20 that terminates the downlink data path and triggers paging when downlink data arrives for the wireless terminal.

In a first step of the signalling, the SeNB 14 determines that its user plane radio bearers for the wireless terminal 16 are inactive. For example, the SeNB 14 may determine that the bearers are inactive responsive to a determination that no data is available in its buffers for transmission to the wireless terminal 16. Alternatively or additionally, the SeNB 14 may determine that the bearers are inactive responsive to a determination that no data has been transmitted via the bearers for a period of time.

In a second step of the signalling, the SeNB 14 indicates to the MeNB 12 that its bearers are inactive. For example, a message comprising such an indication may be transmitted by the SeNB 14 to the MeNB 12. The message may be transmitted via a direct interface (such as the X2 interface).

The MeNB 12 may respond to such an indication in a number of ways, and this is described in more detail below with respect to FIG. 4. In the signalling shown in FIG. 3, data for transmission to the user becomes available, and is transmitted by the SGW 22 to the SeNB 14. The SeNB 14 subsequently transmits the data to the wireless terminal 16 via one or more of the bearers established between the SeNB 14 and the wireless terminal 16. The SeNB 14 also transmits a message to the MeNB 12 to indicate that its radio bearers are active once again. It will be understood by those skilled in the art that, although depicted in the illustration as taking place after the transmission of data to the wireless terminal 16, the transmission of the message to the MeNB 12 may take place simultaneously with, or before, the transmission of data to the wireless terminal 16. The message may be transmitted via a direct interface, as before.

The messages transmitted by the SeNB 14 may be new messages defined in a future standard, or may take advantage of existing messages to provide the indications that the bearers of the SeNB 14 are active or inactive. In the latter case, existing messages such as SENB Modification Required, SENB Release Required or SENB Counter Check Required could be utilized or adapted to contain a field providing the indication.

Thus according to embodiments of the disclosure, the SeNB 14 is able to determine that its bearers are inactive and, responsive to the determination, inform the MeNB 12 of that fact. If the SeNB 14 has previously informed the MeNB 12 that its bearers are inactive, signalling is also defined that enables the SeNB 14 to indicate that its bearers have become active again.

Figure 4:
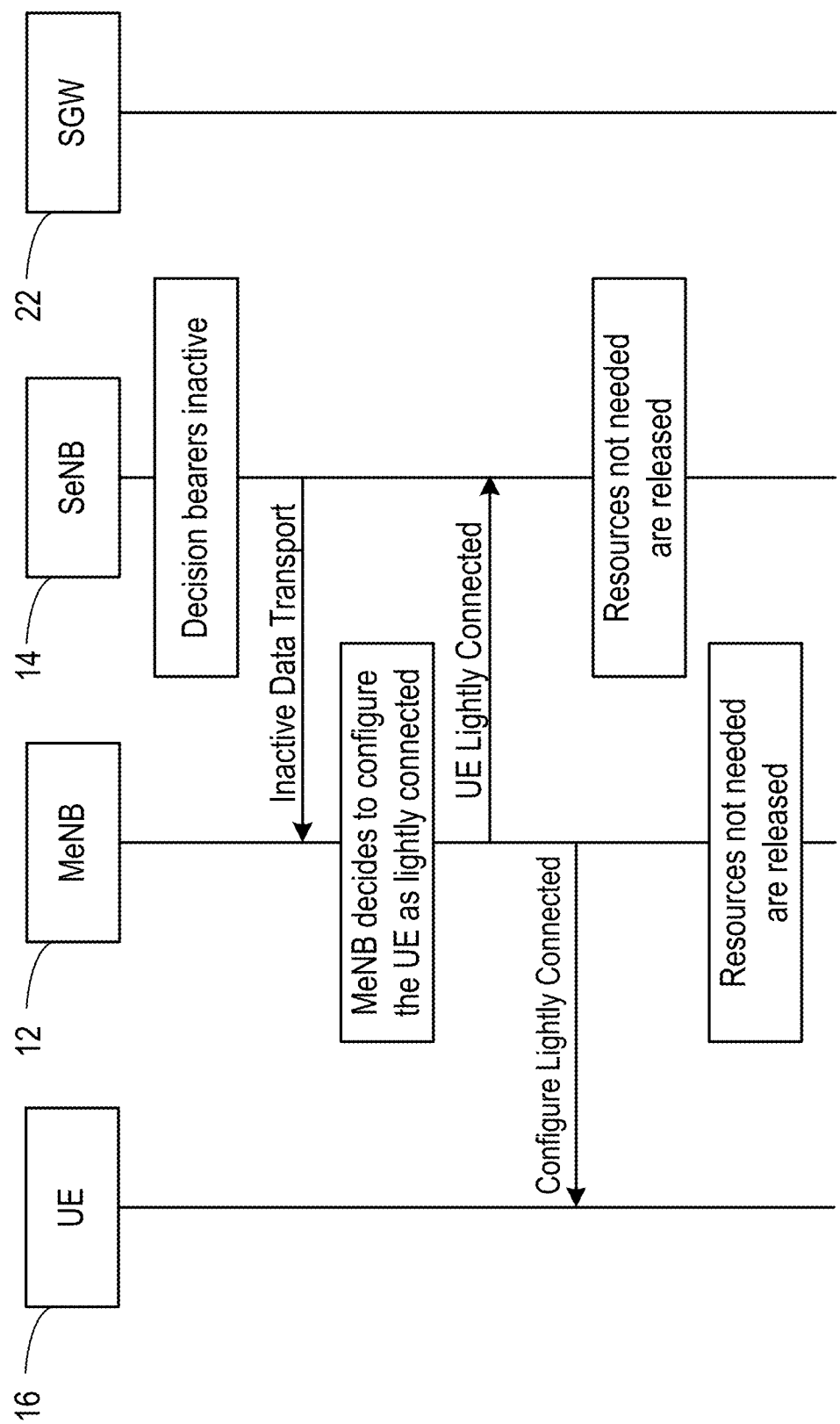
FIG. 4 is a signalling diagram showing signals for entering the inactive mode according to embodiments of the disclosure.

FIG. 4 is a signalling diagram showing the configuration of a wireless terminal in an inactive mode.

The signalling begins as shown in FIG. 3, with a determination by the SeNB 14 that its bearers are inactive, and the transmission of a message from the SeNB 14 to the MeNB 12 indicating that fact. While the bearers of the SeNB 14 are indicated as being inactive, the MeNB 12 determines whether or not to configure the wireless terminal 16 in an inactive mode. As noted above, one or more user plane radio bearers may also be established between the MeNB 12 and the wireless terminal 16. If no user plane bearers are established between the MeNB 12 and the wireless terminal 16, the MeNB 12 may determine that the wireless terminal 16 should be configured in the inactive mode upon receipt of the message from the SeNB 14 indicating that its bearers are inactive (as in this configuration those are the only user plane radio bearers established for the wireless terminal 16). If one or more user plane radio bearers are established between the MeNB 12 and the wireless terminal 16, the determination as to whether to configure the wireless terminal 16 in the inactive mode may also be based on the activity of those bearers. For example, the MeNB 12 may determine that the wireless terminal 16 should be configured in the inactive mode responsive to a determination that it has no data in its buffer(s) for transmission to the wireless terminal 16 (in addition to the information that the SeNB bearers are inactive). Alternatively or additionally, the MeNB 12 may determine that the wireless terminal 16 should be configured in the inactive mode responsive to a determination that no data has been transmitted via the MeNB user plane bearers for a period of time.

When the MeNB 12 decides to configure the wireless terminal 16 as inactive (or lightly connected, etc), the MeNB 12 transmits a message indicating that the wireless terminal 16 is configured as inactive to the SeNB 14. The MeNB 12 also transmits a message to the wireless terminal 16 itself to configure it in the inactive mode.

Upon configuration in the inactive mode, the MeNB 12 stores a context for the wireless terminal in the radio access network, together with an associated identifier for the context and/or the wireless terminal 16. For example, the context may be stored in a memory that is local to the MeNB 12; the memory may be shared between a plurality of nodes. The context may comprise an access stratum (AS) context for the wireless terminal 16. The context may comprise one or more of: a sequence length and a sequence number (indicating the sequence numbering that been reached upon entry to the inactive mode, and enabling the sequence to begin from the correct point upon exit from the inactive mode); and security information (such as a key enabling messages from the wireless terminal to be decrypted). In general, the context may comprise the data necessary to enable the bearers previously managed by the MeNB 12 to be resumed.

Upon reception of the message from the MeNB 12, the SeNB 14 also stores a context for the wireless terminal in the radio access network, together with an associated identifier for the context and/or the wireless terminal 16. The identifier may be the same as utilized by the MeNB 12, or different; in either case, the identifier to be used by the SeNB 14 may be contained within the message from the MeNB 12. Again, the context may be stored in a memory that is local to the SeNB 14. The context may comprise similar data to the context stored by the MeNB 12, but relate to the bearers established with and controlled by the SeNB 14.

Upon configuration in the inactive mode, radio resources reserved for the bearers of the wireless terminal 16 (for both the MeNB 12 and the SeNB 14) can be released. Since no user data will be sent until the wireless terminal 16 contacts the network (e.g. mobile originated or after receiving a page) radio resources can be released in both nodes. Further, the SeNB 14 may also release any resources allocated to transport user data from the SeNB 14 to the MeNB 12 in the event that an SCG split bearer is established for the wireless terminal.

Thus the signalling in FIG. 4 allows a wireless terminal configured for dual connectivity (and utilizing an SCG bearer and/or an SCG split bearer) to enter an inactive mode, and benefit from the advantages associated with such a mode without necessarily losing dual connectivity.

Figure 5:
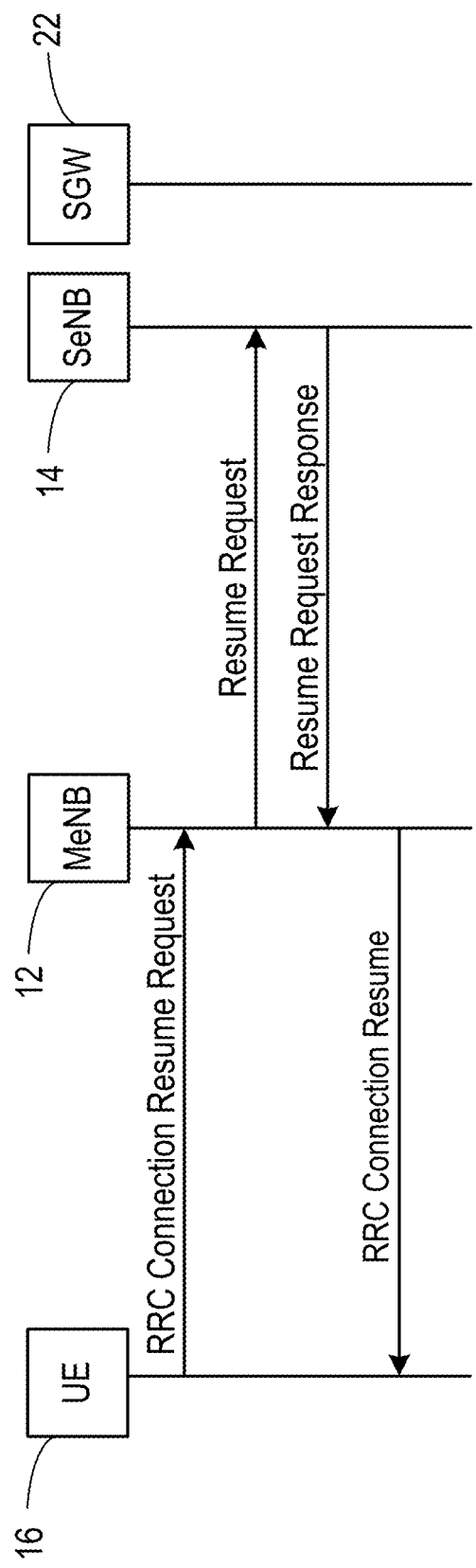
FIG. 5 is a signalling diagram showing resumption of a connection according to embodiments of the disclosure.

FIG. 5 is a signalling diagram showing exit from the inactive mode according to embodiments of the disclosure. Thus, the wireless terminal 16 either receives a page from the network in response to some data that is available for transmission to the wireless terminal 16, or the wireless terminal 16 itself wishes to transmit some data to the network 10.

A first illustrated signal thus comprises a message transmitted from the wireless terminal 16 to the MeNB 12 indicating that it wishes to resume its connection with the network 10. The message may comprise an RRC Connection Resume Request message, for example. The message may also comprise an indication of the identifier associated with the context stored in the MeNB 12 (and also potentially the SeNB 14) upon entry to the inactive mode.

Upon receipt of the request message, the MeNB 12 transmits a resume request message to the SeNB 14. The message may be transmitted via a direct interface (such as an X2 interface) for example. The message may be sent as a new message to be defined in future standards, or take advantage of existing messages by adding an additional information element to messages such as SeNB Addition Request message or SeNB Modification Request Message.

The message may also comprise an indication of the identifier associated with the context stored by the SeNB 14 (see FIG. 4). Responsive to receipt of the message from the MeNB 12, the SeNB 14 accesses the stored context using the identifier and determines whether it has available radio resources to maintain the bearer(s) that were previously established with the wireless terminal 16 when it entered the inactive state. For example, the SeNB 14 will in general serve multiple wireless terminals and therefore it is possible that the SeNB 14 may not have sufficient available radio resources to maintain a connection with the wireless terminal 16.

If there are not sufficient available resources, the SeNB 14 may transmit a response message indicating that fact to the MeNB 12. However, in the event that there are sufficient available resources, the SeNB 14 allocates resources for the connection to the wireless terminal 16 and transmits a response message to the MeNB 12 indicating that the resources are available and ready to be used. In either case, the message may be sent as a new message to be defined in future standards, or take advantage of existing messages by adding an additional information element to messages such as SENB Addition Request Acknowledge message or SeNB Modification Request Acknowledge Message.

The MeNB 12 receives the response message and transmits a message to the wireless terminal 16 indicating that the connection with the network 10 is resumed. This message may be largely conventional, and those skilled in the art will be aware of the signalling and data that is required to resume the connection with the network 10. However, the message may also be adapted to indicate to the wireless terminal 16 whether it is configured with dual (if the response message from the SeNB 14 was positive) or single connectivity (if the response message from the SeNB 14 was negative).

Figure 6:
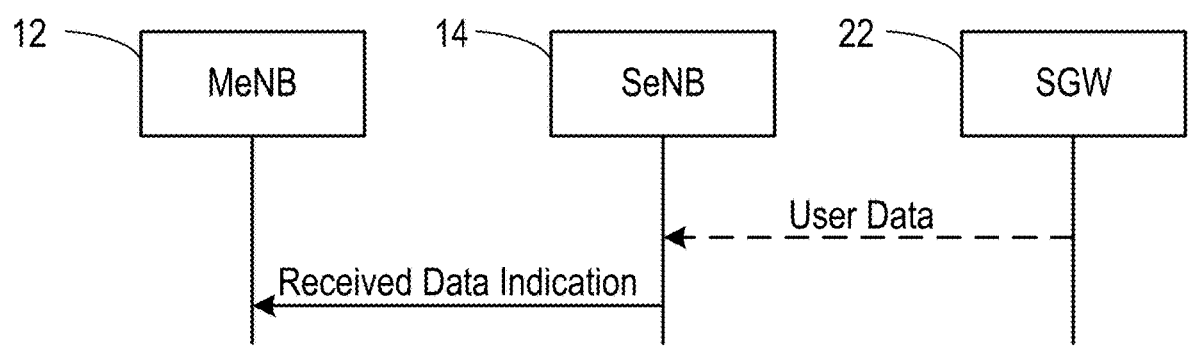
FIG. 6 is a signalling diagram showing further signals according to embodiments of the disclosure.

FIG. 6 illustrates signalling according to embodiments of the disclosure, in the scenario where a wireless terminal 16 is configured in the inactive mode, and the SeNB 14 receives data to be transmitted to the wireless terminal 16.

For a wireless terminal in lightly connected or inactive mode where the SeNB 14 uses an SCG bearer or an SCG split bearer (or both), the MeNB 12 may be unaware of any user data received by the SeNB 14 from the core network 20. In order to deliver the data to the wireless terminal, the SeNB 14 needs to indicate to the MeNB 12 that data has arrived, such that the MeNB 12 can trigger RAN-initiated paging of the wireless terminal 16.

Thus the first signal in FIG. 6 is an indication from the SGW 22 that data is available for transmission to the wireless terminal 16. The indication may comprise the data itself, sent to the SeNB 14 ready for transmission to the wireless terminal 16. Responsive to receipt of the indication from the SGW 22, the SeNB 14 transmits to the MeNB 12 a message indicating that the SeNB 12 has received data for the wireless terminal 16. As before, the message may be transmitted via a direct interface (such as the X2 interface), and may comprise a newly defined message or an addition to an existing message. Responsive to receipt of the message, the MeNB 12 initiates paging of the wireless terminal 16. The signalling described above with respect to FIG. 5 may then be followed to exit the inactive mode.

Paging policy differentiation is an optional feature that allows the paging node—MeNB in the present context—to apply different paging strategies for different traffic or service types provided within the same public data network (PDN) connection (in 5G terminology: within the same PDU Session, see 3GPP TS 23.799v2.0.0).

When the MeNB 12 supports Paging Policy Differentiation, the SeNB 14 may provide a Paging Policy Indication in the message sent to the MeNB 12. The Paging Policy Indication may be based on information received with the downlink packet received from the SGW 22. The MeNB 12 may then page the wireless terminal 16 in accordance with the paging policy indicated in the message. The paging policy indication may comprise an indicator of the priority of the downlink packet such as a quality-of-service (QoS) indicator, e.g., a QoS class identifier (QCI).

In another example, as defined in TS 23.228, v13.8.0, the proxy call session control function (P-CSCF) may support Paging Policy Differentiation by marking packet(s) to be sent towards the wireless terminal that relate to specific IP multimedia subsystem (IMS) services (e.g. conversational voice as defined in IMS multimedia telephony service). Hence the Paging Policy Indication value within this information value is the value of the differentiated services code point (DSCP) in the type of service (TOS) (IPv4) or textual convention (TC) (IPv6) information received in the IP payload of the general packet radio service tunnelling protocol-user (GTP-U) packet from the P/SGW (evolved packet system, EPS) or the user plane function (UPF) (5G) (see IETF RFC 2474).

According to embodiments of the disclosure, neither the P/SGW 22 nor UPF shall modify the received downlink IP packet e.g. the DSCP (IPv4)/TC (IPv6). For each bearer and for each packet of packet data network (PDN) type IPv4, IPv6 or IPv4v6 that triggers a Downlink Data Notification, the SGW shall send the DSCP in TOS (IPv4)/TC (IPv6) information received in the IP payload of the GTP-U packet from the PGW in the Paging Policy Indication in the Downlink Data Notification.

The operator may configure the MeNB in such a way that the Paging Policy Indicator only applies to certain home public land mobile networks (HPLMNs) and/or access point names (APNs) and/or Quality of service (QoS)/QoS class identifier (QCI) Flow (for the concept of the QoS Flows see 3GPP TS 23.799, v2.0.0).

Network configuration may ensure that the information used as a trigger for Paging Policy Indication is not changed within the EPS/5GS or in general, within the system.

Network configuration may ensure that the specific DSCP in TOS (IPv4)/TC (IPv6) value, used as a trigger for Paging Policy Indication, is managed correctly in order to avoid the accidental use of certain paging policies.

Additionally or alternatively, the message transmitted from the SeNB 14 to the MeNB 12 may comprise an indicator of the priority of the downlink packet such as a quality-of-service (QoS) indicator, e.g., a QoS class identifier (QCI).

Figure 7:
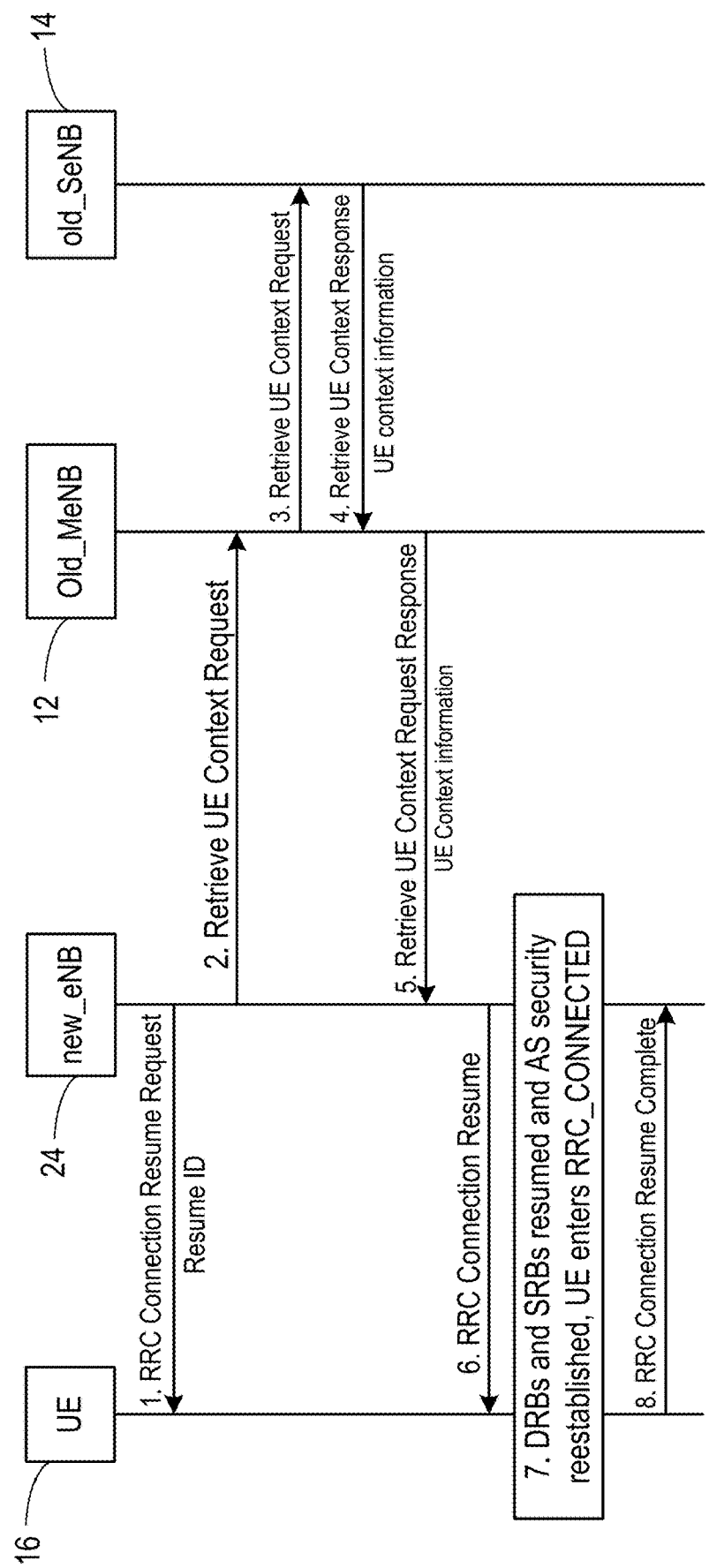
FIG. 7 is a signalling diagram showing resumption of a connection according to embodiments of the disclosure.

FIG. 7 is a signalling diagram according to embodiments of the disclosure showing exit from the inactive mode, when the wireless terminal 16 has moved and attempts to connect to a new base station 24 (as a result of UE-initiated or RAN-initiated paging).

The signalling is substantially the same as that shown in FIG. 5. However, as the wireless terminal 16 has moved since entering the inactive mode, it now attempts to connect to a new base station 24 ("new_eNB"). For example, the wireless terminal 16 may have left the coverage area provided by the MeNB 12 and the SeNB 14, or the signal strength associated with the new base station may be stronger than that associated with the MeNB 12 and the SeNB 14. In order to resume the connection with the wireless terminal 16 efficiently, the new base station 24 needs the context associated with the wireless terminal 16 (which was stored by the MeNB 12 and the SeNB 14 upon entry to the inactive mode—see FIG. 4).

The wireless terminal 16 thus transmits a message to the new base station 24 requesting exit from the inactive mode and resumption of the connection with the network 10. The message may comprise the identifier associated with the context and/or the wireless terminal 16.

Based on the identifier, the new base station 24 is able to determine the identity of the MeNB 12, with which the wireless terminal 16 was connected upon entry to the inactive mode. For example, the identifier may comprise an indication of the identity of the network node that assigned the identifier (i.e. the MeNB 12). The new base station 24 thus transmits a message to the MeNB 12 requesting the context of the wireless terminal 16. The message may contain the identifier associated with the context and/or the wireless terminal 16.

However, the MeNB 12 may only have part of the context, i.e. the portion relating to the bearers established between the MeNB 12 and the wireless terminal 16. Thus the MeNB 12 transmits its own request message to the SeNB 14 requesting the portion of the context that relates to the SeNB bearers. Again, the request message may comprise the appropriate identifier to enable the context to be found. The SeNB 14 retrieves the portion of the context relating to bearers between the SeNB 14 an the wireless terminal, and transmits it to the MeNB 12 in a response message.

The MeNB 12 is thus able to respond to the request message from the new base station 24 by transmitting the complete context for the wireless terminal 16. The new base station 24 can use the context to resume the connection between the wireless terminal 16 and the network. For example, based on the received context, the new base station 24 may be able to resume each of the bearers that were previously split between the MeNB 12 and the SeNB 14 (e.g. using carrier aggregation).

Figure 8:
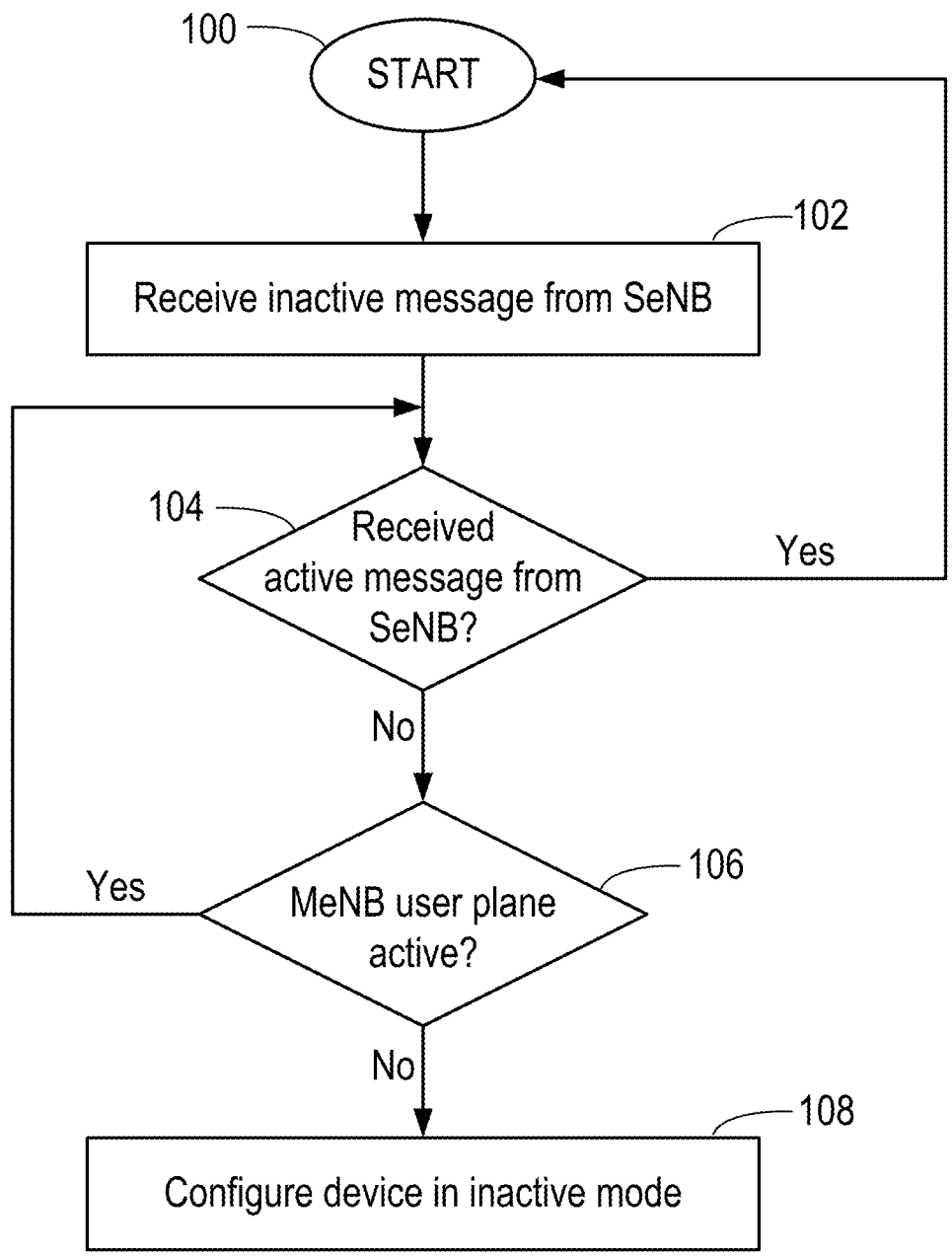
FIG. 8 is a flowchart of a method in a primary network node according to embodiments of the disclosure.

FIG. 8 is a flowchart of a method according to embodiments of the disclosure. The method may be carried out, for example, in a network node operating as the primary network node, or master network node, in a dual connectivity configuration for a wireless terminal. For example, the method may be carried out in the MeNB 12 described above.

The method begins in step 100. The primary network node has established at least a control plane radio bearer with a wireless terminal, and may also have established one or more user plane radio bearers with the wireless terminal. Any user plane radio bearers may be of MCG bearer or MCG split bearer type. A secondary network node (e.g. the SeNB 14) has established one or more user plane radio bearers with the wireless terminal. These bearers may be SCG bearers or SCG split bearers, for example. The wireless terminal is in an active mode, such as RRC CONNECTED.

In step 102, the primary network node receives a message indicating that the user plane radio bearers of the secondary network node are inactive. For example, the message may be received from the secondary network node itself, either indirectly or directly via an interface between the two nodes (such as an X2 interface or similar). In alternative embodiments, the wireless terminal may transmit a message to the primary network node indicating that the bearers associated with the secondary network node are inactive. In either case, there may be no data available to transmit over the radio bearers, or no data may have been transmitted over the radio bearers for a threshold period of time since the most recent transmission. The messages transmitted by the secondary network node or the wireless terminal may be new messages defined in a future standard, or may take advantage of existing messages to provide the indications that the bearers of the secondary network node are active or inactive. In the latter case, existing messages such as SENB Modification Required, SENB Release Required or SENB Counter Check Required could be utilized or adapted to contain a field or information element providing the indication.

In step 104, the primary network node checks whether it has received a message (from the secondary network node or from the wireless terminal) indicating that the bearer(s) for the secondary network node have become active since receiving the indication in step 102, i.e. data is available for transmission over the bearer(s), or data has been transmitted over the bearer(s). If such a message has been received, the flow can return to step 100, and the wireless terminal can remain in the active or connected mode until further messages indicating inactivity are received.

If no such message has been received, in an optional step 106, the primary network node determines whether any user plane radio bearers established between itself and the wireless terminal are active or inactive. For example, the primary network node may determine that a bearer is inactive if there is no data available to transmit over the radio bearer, or no data has been transmitted over the radio bearer for a threshold period of time since the most recent transmission. If more than one user plane bearer is established between the primary network node and the wireless terminal, the primary network node may determine whether all user plane radio bearers are active or inactive.

If no user plane radio bearers are established between the primary network node and the wireless terminal, step 106 can be omitted.

If the user plane radio bearer, or at least one of the user plane radio bearers, is active, the flow can revert to step 104. That is, the primary network node may continue to check whether any message has been received to indicate that the bearers associated with the secondary network node have become active, and also to check whether the user plane bearers associated with the primary network node have become inactive.

If the bearers associated with the secondary network node remain inactive, and the user plane radio bearers associated with the primary network node are determined to be inactive, flow proceeds to step 108 in which the wireless terminal is configured in an inactive mode.

Step 108 may comprise a number of sub steps, which can be carried out in any order.

For example, the primary network node may store a context for the wireless terminal in the radio access network, together with an associated identifier for the context and/or the wireless terminal. The context may be stored in a memory that is local to the primary network node; the memory may be shared between multiple nodes. The context may comprise an access stratum (AS) context for the wireless terminal. The context may comprise one or more of: a sequence length and a sequence number (indicating the sequence numbering that been reached upon entry to the inactive mode, and enabling the sequence to begin from the correct point upon exit from the inactive mode); and security information (such as a key enabling messages from the wireless terminal to be decrypted). In general, the context may comprise the data necessary to enable the bearers previously managed by the primary network node to be resumed without additional signalling to set up the bearers.

Note that in one embodiment the context stored by the primary network node may relate only to the bearers established between the primary network node and the wireless terminal (i.e. and not the bearers established between the secondary network node and the wireless terminal).

The primary network node may transmit a message to the secondary network node indicating that the wireless terminal is configured as inactive. The primary network node may also transmit a message to the wireless terminal to configure it in the inactive mode. Both messages may comprise an indication of the identifier associated with the context; however, in other embodiments the secondary network node and/or the wireless terminal may be able to determine the identifier without receiving it via a message from the primary network node (for example, if the identifier is based on some known value for the wireless terminal, such as its unique ID).

Upon reception of the message from the primary network node, the secondary network node may also store a context for the wireless terminal in the radio access network, together with an associated identifier for the context and/or the wireless terminal. The identifier may be the same as utilized by the primary network node, or different. Again, the context may be stored in a memory that is local to the secondary network node. The context may comprise similar data to the context stored by the primary network node, but relate to the bearers established with and controlled by the secondary network node.

Upon configuration in the inactive mode, for example once messages have been transmitted to both the secondary network node and the wireless terminal, radio resources reserved for the bearers of the wireless terminal (for both the primary network node and the secondary network node) can be released. Since no user data will be sent until the wireless terminal contacts the network (e.g. mobile-originated or after receiving a page) radio resources can be released in both nodes. Further, the secondary network node may also release any resources allocated to transport user data from the secondary network node to the primary network node in the event that an SCG split bearer is established for the wireless terminal.

The wireless terminal is thus configured in an inactive mode, in which a connection between the radio access network (i.e. the primary and secondary network nodes) and the core network for the wireless terminal is maintained, but in which no active connection is maintained between the radio access network and the wireless terminal.

It will be appreciated that steps 104 and 106 may be carried out in a different order to the one illustrated. That is, the primary network node may determine whether user plane radio bearers associated with it are active, and only once determined inactive check to see whether a message has been received to indicate that bearers associated with the secondary network node have become active. For example, in one implementation the primary network node may initiate a timer upon each transmission over the user plane radio bearers associated with it. If the timer expires without further transmissions over the user plane radio bearer, the bearer can be considered inactive. At that point, the primary network node may check to see whether any message has been received to indicate that the bearers associated with the secondary network node have become active, before configuring the wireless terminal in the inactive mode.

Figure 9:
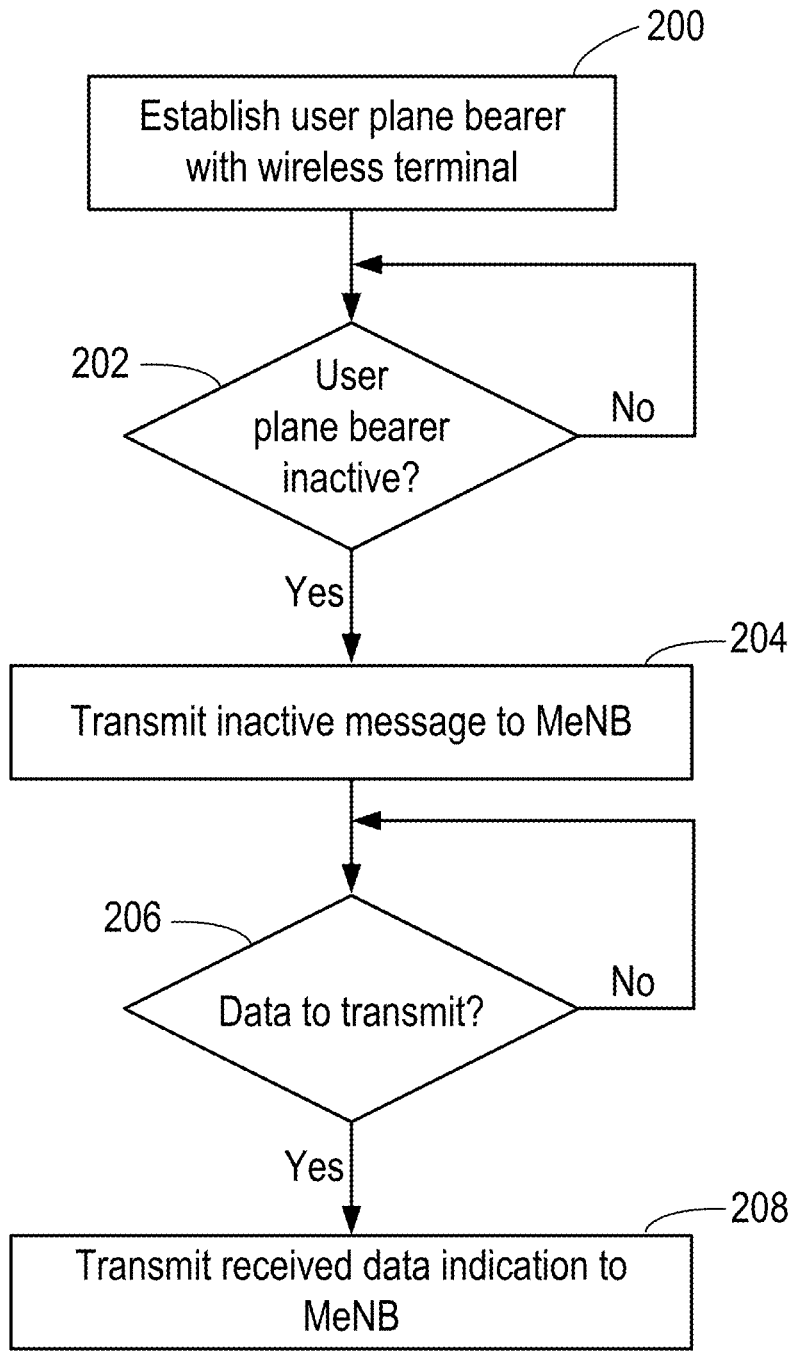
FIG. 9 is a flowchart of a method in a secondary network node according to embodiments of the disclosure.

FIG. 9 is a flowchart of a method according to embodiments of the disclosure. The method may be carried out, for example, in a network node operating as the secondary network node, or slave network node, in a dual connectivity configuration for a wireless terminal. For example, the method may be carried out in the SeNB 14 described above.

Figure 2:
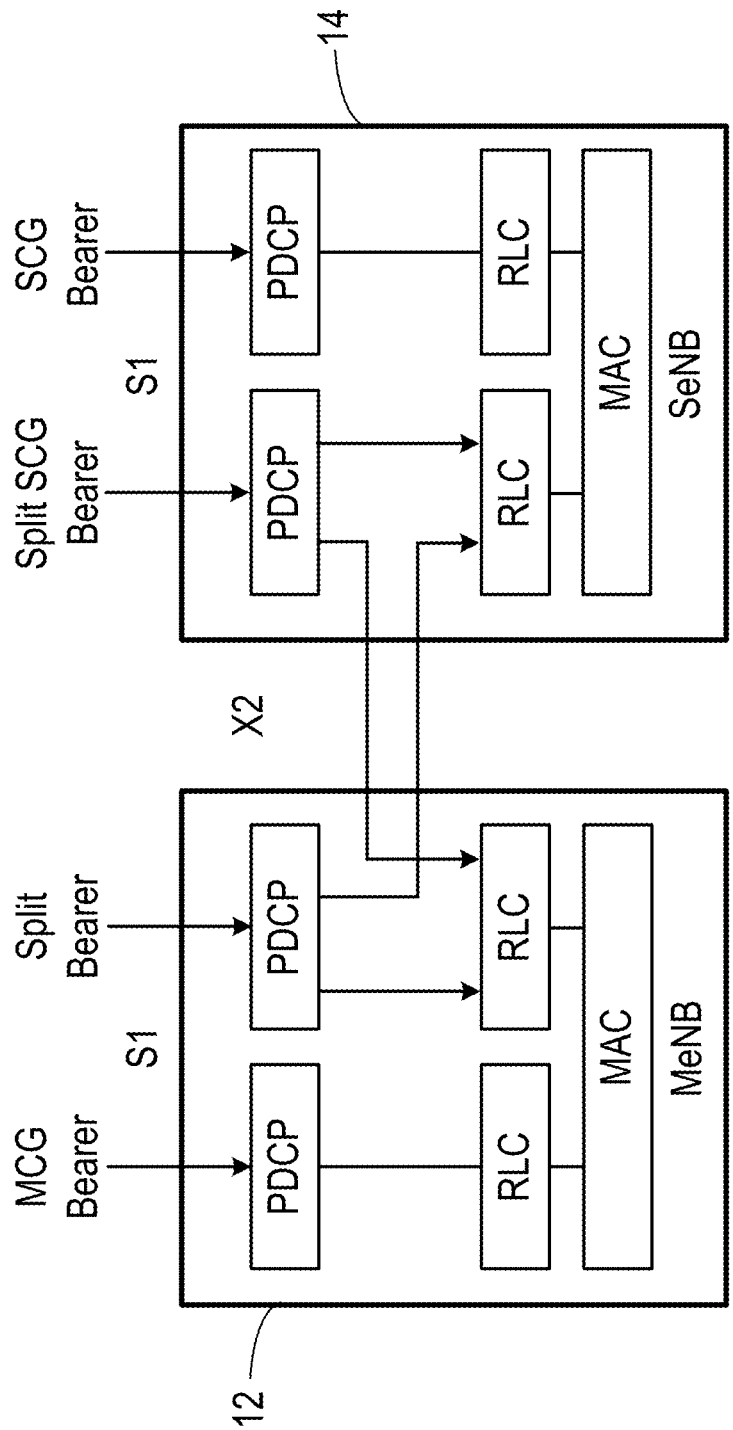
FIG. 2 shows four bearer types for dual connectivity configurations.

The method begins in step 200, in which the secondary network node establishes one or more user plane radio bearers with the wireless terminal. The bearers may be configured as SCG bearers or SCG split bearers, for example. See FIG. 2. The configuration and set up of the user plane radio bearer(s) may be largely conventional and thus is not described in further detail herein.

In step 202, the secondary network node determines whether the user plane radio bearers have become inactive. If more than one user plane radio bearer is established with the wireless terminal, the secondary network node may determine whether all of the bearers have become inactive.

For example, a bearer may be determined as inactive if there is no data available for transmission to the wireless terminal using the bearer. Alternatively or additionally, a bearer may be determined as inactive if no data has been transmitted over the bearer (either by the secondary network node or the wireless terminal) for a threshold period of time. For example, the secondary network node may initiate a timer upon transmission or reception of data over the bearer; if the timer expires before any further transmission or reception of data, the bearer may be determined as inactive.

If the bearer is not inactive, the flow repeats step 202 until the radio bearer is determined to be inactive. Thus, in some embodiments, the secondary network node may continually check whether its user plane radio bearers are inactive.

If the bearer is inactive, flow proceeds to step 204 in which the secondary network node transmits a message to the primary network node, indicating that the bearers associated with the secondary network node have become inactive. The message may be transmitted either indirectly or directly via an interface between the two nodes (such as an X2 interface or similar). The messages transmitted by the secondary network node may be new messages defined in a future standard, or may take advantage of existing messages to provide the indications that the bearers of the secondary network node are active or inactive. In the latter case, existing messages such as SENB Modification Required, SENB Release Required or SENB Counter Check Required could be utilized or adapted to contain a field or information element providing the indication.

The primary network node may respond to the message by configuring the wireless terminal in an inactive mode, and thus the secondary network node may receive one or messages indicating that the wireless terminal has been configured in the inactive mode. For further details regarding this aspect, see the disclosures above with respect to FIGS. 4 and 8.

Flow proceeds to step 206, in which the secondary network node determines whether it has data to transmit to the wireless terminal. That is, whether or not the wireless terminal is configured in the inactive mode, the secondary network node may monitor for the presence of data to transmit to the wireless terminal over the radio bearer(s) established in step 200. For example, the secondary network node may receive such data, or a corresponding notification, from a serving gateway associated with the core network. If no data is available to transmit, the method continues to cycle back to step 206 and thus the secondary network node continues to check whether there is data available to transmit to the wireless terminal.

If data is available to transmit, the method proceeds to step 208 in which the secondary network node transmits a message indicating that fact to the primary network node. If the wireless terminal has been configured in the inactive mode, the primary network node can initiate paging of the wireless terminal and resumption of the bearers between the wireless terminal and the radio access network (and particularly with the secondary network node). See also FIG. 6. Upon resumption of the bearer(s) with the wireless terminal, the secondary network node is able to transmit the data to the terminal. If the wireless terminal has not been configured in the inactive mode (i.e. the bearers established in step 200 are still active), the secondary network node can immediately proceed to transmit the data to the wireless terminal using the established bearer(s).

For example, the messages transmitted by the secondary network node may be new messages defined in a future standard, or may take advantage of existing messages to provide the indications that the bearers of the secondary network node are active or inactive. In the latter case, existing messages such as SENB Modification Required, SENB Release Required or SENB Counter Check Required could be utilized or adapted to contain a field providing the indication.

The description above focuses on actions carried out by the secondary network node. However, it will be apparent to those skilled in the art that the method illustrated in FIG. 9 may also be carried out by the wireless terminal itself. That is, the wireless terminal may determine whether bearers established between itself and the secondary network node have become inactive and transmit messages indicating that fact to the primary network node. Similarly, the wireless terminal may determine whether it has data available to transmit over the bearers established with the secondary network node, and indicate that fact to the primary network node by transmitting a suitable message. Note that the latter step may not be possible, however, if the wireless terminal has in the meantime been configured in the inactive mode (in which a random access request may be necessary to resume a connection with the radio access network).

Figure 10:
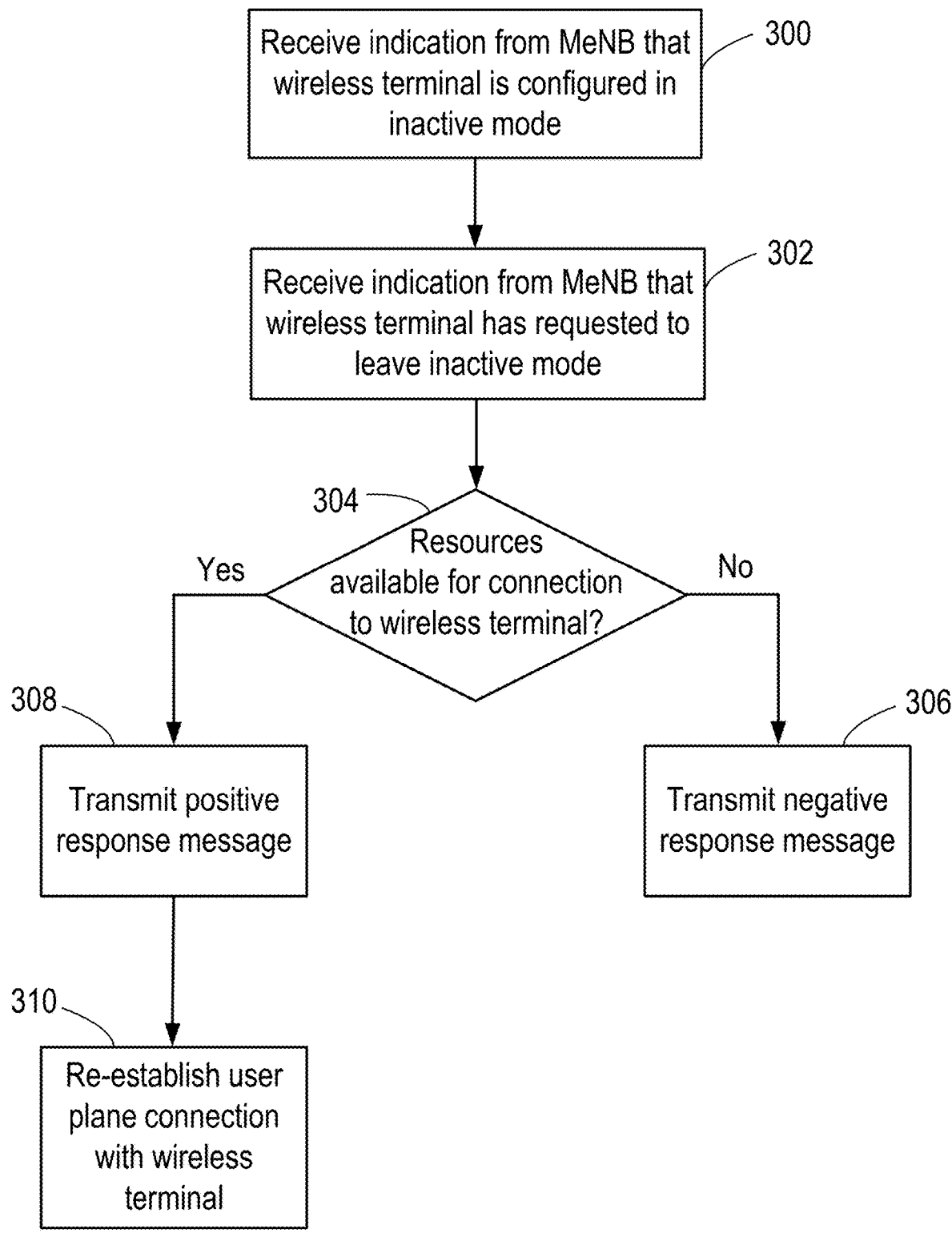
FIG. 10 is a flowchart of a further method in a secondary network node according to embodiments of the disclosure.

FIG. 10 is a flowchart of a method according to embodiments of the disclosure. The method may be carried out, for example, in a network node operating as the secondary network node, or slave network node, in a dual connectivity configuration for a wireless terminal. For example, the method may be carried out in the SeNB 14 described above.

The method begins in step 300, in which the secondary network node receives a message from the primary network node to indicate that the wireless terminal has been configured in the inactive mode. For example, the method may therefore take place after step 204 of the method shown in FIG. 9.

In response to receiving the message, the secondary network node may store a context for the wireless terminal in the radio access network, together with an associated identifier for the context and/or the wireless terminal. The context may be stored in a memory that is local to the secondary network node; the memory may be shared between nodes. The context may comprise an access stratum (AS) context for the wireless terminal. The context may comprise one or more of: a sequence length and a sequence number (indicating the sequence numbering that been reached upon entry to the inactive mode, and enabling the sequence to begin from the correct point upon exit from the inactive mode); and security information (such as a key enabling messages from the wireless terminal to be decrypted). In general, the context may comprise the data necessary to enable the bearers previously managed by the secondary network node to be resumed without additional signalling to set up the bearers.

The secondary network node also releases all radio resources (e.g. time slots, frequencies, orthogonal codes, etc) that were previously allocated for the bearer(s) associated with the wireless terminal.

In step 302, while the wireless terminal is configured in the inactive mode, the secondary network node receives an indication from the primary network node that the wireless terminal has requested to exit the inactive mode (i.e. to resume the connection with the radio access network). For example, the wireless terminal may be responding to a network-initiated paging message, or have data to transmit to the network.

The message received from the primary network node may comprise an indication of the identify associated with the wireless terminal and/or the context, to enable the context to be retrieved from storage.

In step 304, the secondary network node determines whether it has sufficient available radio resources for the proposed resumed bearer(s) with the wireless terminal. That is, the secondary network node will in general serve multiple different wireless devices, with resources allocated to each. If additional wireless terminals have connected to the secondary network node since the wireless terminal was configured in the inactive mode (and the resources associated with its bearer(s) released), there may be insufficient available resources to resume the connection.

If there are insufficient resources, the method proceeds to step 306 in which the secondary network node transmits a message to the primary network node comprising an indication of that fact. The primary network node may then resume the connection with the wireless terminal using a single-connectivity configuration. The message may also contain the context stored by the secondary network node, to enable the bearer(s) previously established with the secondary network node to be resumed with the primary network node (or a third network node that may act as a secondary network node in a dual connectivity configuration). Alternatively, the bearer(s) previously established with the secondary network node may not be resumed.

If there are sufficient resources, the method proceeds to step 308 in which the secondary network node transmits a message to the primary network node comprising an indication of that fact. The primary network node may then resume the connection with the wireless terminal using the previous dual connectivity configuration, and particularly the user plane radio bearer(s) previously established with the secondary network node may be resumed by the secondary network node in step 310. For example, the secondary network node may retrieve the context previously stored to enable the bearer(s) previously established with the secondary network node to be resumed efficiently and quickly.

Alternatively, if there are sufficient resources, the secondary network node may proceed directly to step 310, and resume the connection with the wireless terminal without sending a message to the primary network node.

A further alternative to these possibilities is that the secondary network node may determine that it has sufficient available resources only for a subset of the bearers that were previously established with the secondary network node. That is, the secondary network node may initially establish K user plane radio bearers with the wireless terminal (where K is an integer greater than one), but determine in step 304 that there are sufficient available resources for only a subset of n user plane radio bearers (where n is an integer and $1 \leq n < K$). In this case the secondary network node may transmit a signal to the primary network node (e.g. step 308) indicating the number and/or identity of the radio bearers that it has sufficient resources for. The primary network node may then choose either to resume only those n bearers, to transfer the bearers to be handled by the primary network node, or to drop the connection to the wireless terminal altogether.

Thus embodiments of the disclosure provide methods and apparatus that allow a wireless terminal configured with dual connectivity to enter an inactive mode, and to resume the dual connectivity configuration upon exiting the inactive mode.

Figure 11:
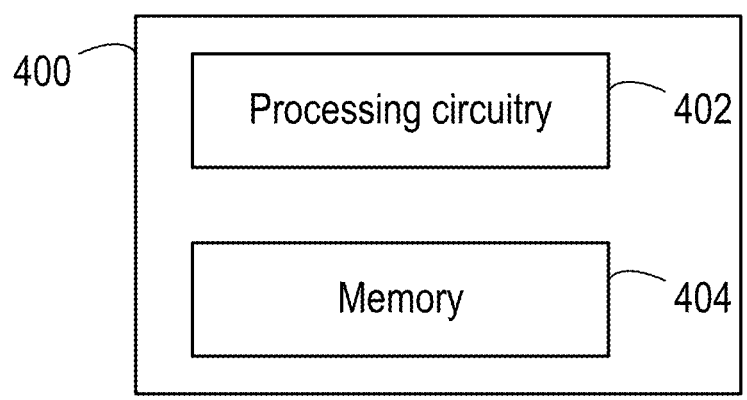
FIG. 11 is a schematic diagram of a network node according to embodiments of the disclosure.

FIG. 11 is a schematic diagram of a network node 400 according to embodiments of the disclosure. For example, the network node 400 may be a radio access node (such as an eNodeB or a gNodeB), or a node connected to the core network or within a server environment and communicatively coupled to such a radio access node.

The node 400 may be operable as a primary network node for a wireless terminal configured with dual connectivity, and thus suitable for performing the actions and methods associated with the MeNB 12 described above.

The network node 400 comprises processing circuitry 402 and a non-transitory computer-readable medium 404 storing instructions which, when executed by the processing circuitry 402, cause the node 400 to receive, from a secondary network node providing user plane connectivity for the wireless terminal, a message indicating that the secondary network node has no data to transmit to the wireless terminal; and, based at least in part on the received message, configure the wireless terminal in an inactive mode.

Figure 12:
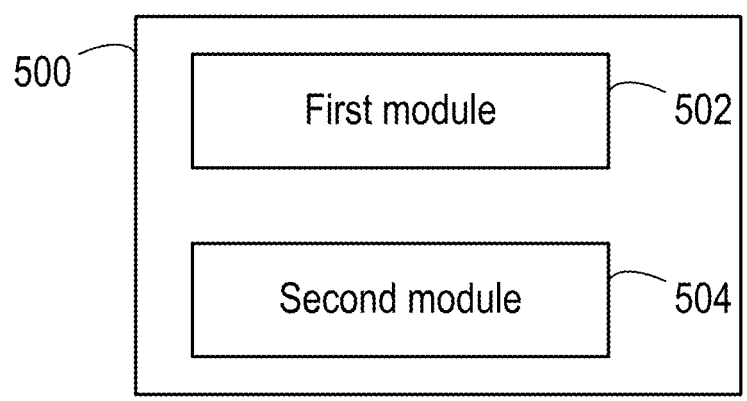
FIG. 12 is a schematic diagram of a network node according to further embodiments of the disclosure.

FIG. 12 is a schematic diagram of a network node 500 according to further embodiments of the disclosure. For example, the network node 500 may be a radio access node (such as an eNodeB or a gNodeB), or a node connected to the core network or within a server environment and communicatively coupled to such a radio access node.

The node 500 may be operable as a primary network node for a wireless terminal configured with dual connectivity, and thus suitable for performing the actions and methods associated with the MeNB 12 described above.

The network node 500 comprises a first module 502 configured to receive, from a secondary network node providing user plane connectivity for the wireless terminal, a message indicating that the secondary network node has no data to transmit to the wireless terminal. The node 500 further comprises a second module 504 configured to configure, based at least in part on the received message, the wireless terminal in an inactive mode.

Figure 13:
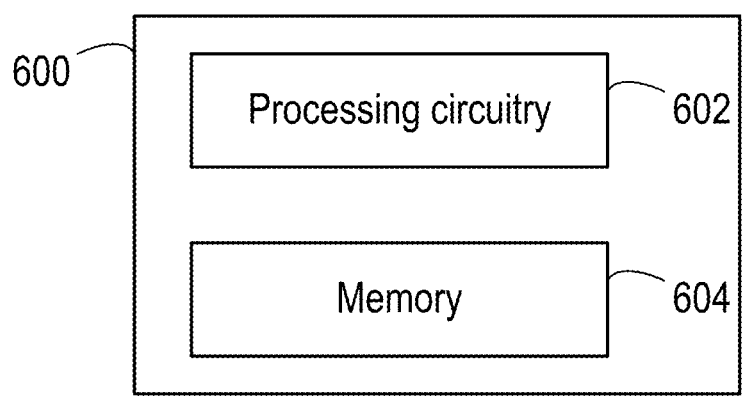
FIG. 13 is a schematic diagram of another network node according to embodiments of the disclosure.

FIG. 13 is a schematic diagram of a network node 600 according to embodiments of the disclosure. For example, the network node 600 may be a radio access node (such as an eNodeB or a gNodeB), or a node connected to the core network or within a server environment and communicatively coupled to such a radio access node.

The node 600 may be operable as a secondary network node for a wireless terminal configured with dual connectivity, and thus suitable for performing the actions and methods associated with the SeNB 14 described above.

The network node 600 comprises processing circuitry 602 and a non-transitory computer-readable medium 604 storing instructions which, when executed by the processing circuitry 602, cause the node 600 to determine whether the secondary network node has data to transmit to the wireless terminal; and, responsive to a determination that the secondary network node has no data to transmit to the wireless terminal, transmit, to a primary network node providing control plane connectivity for the wireless terminal, a message indicating that the secondary network node has no data to transmit to the wireless terminal, to enable the wireless terminal to be configured in an inactive mode.

Figure 14:
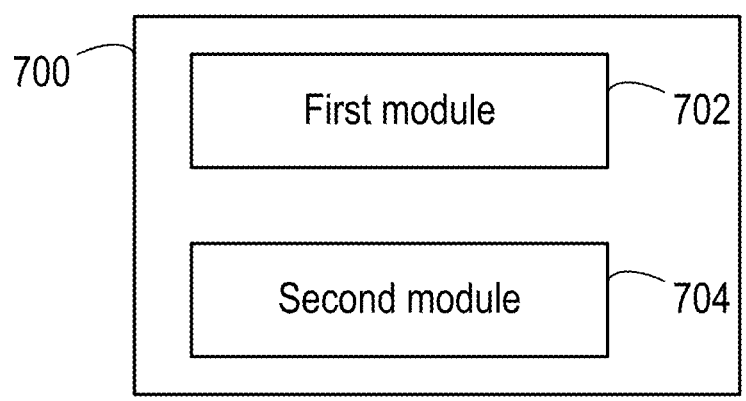
FIG. 14 is a schematic diagram of another network node according to further embodiments of the disclosure.

FIG. 14 is a schematic diagram of a network node 700 according to further embodiments of the disclosure. For example, the network node 700 may be a radio access node (such as an eNodeB or a gNodeB), or a node connected to the core network or within a server environment and communicatively coupled to such a radio access node.

The node 700 may be operable as a secondary network node for a wireless terminal configured with dual connectivity, and thus suitable for performing the actions and methods associated with the SeNB 14 described above.

The network node 700 comprises a first module 702 configured to determine whether the secondary network node has data to transmit to the wireless terminal. The node 700 further comprises a second module 704 configured to, responsive to a determination that the secondary network node has no data to transmit to the wireless terminal, transmit, to a primary network node providing control plane connectivity for the wireless terminal, a message indicating that the secondary network node has no data to transmit to the wireless terminal, to enable the wireless terminal to be configured in an inactive mode.

Although the text above has described embodiments of the disclosure in the context of the 3GPP specifications, specifically Long Term Evolution and developments thereto, those skilled in the art will appreciate that the methods, apparatus and concepts described herein may equally apply to other radio access technologies and the networks that employ them.

What is claimed is:

1. A method in a network node for a telecommunications network, the network node operating as a primary network node for a wireless terminal configured with dual connectivity, the method comprising:
   receiving a message indicating that a secondary network node, which provides user plane connectivity for the wireless terminal, has no data to transmit to the wireless terminal; and
   based at least in part on the received message, configuring the wireless terminal in an inactive mode, wherein configuring the wireless terminal in the inactive mode comprises:
      maintaining an active connection for the wireless terminal between the network node and a core network of the telecommunications network; and
      releasing resources for a connection between the network node and the wireless terminal.

2. The method of claim 1, wherein configuring the wireless terminal in the inactive mode comprises storing at least a first portion of a context of the wireless terminal at a location accessible by the network node.

3. The method of claim 2, wherein the context comprises one or more of: a sequence number of data transmitted between the primary network node and the wireless terminal reached at the time of configuration of the wireless terminal in the inactive mode; a sequence length; and security data for the connection between the primary network node and the wireless terminal.

4. The method of claim 1, wherein a connection between the primary network node and the wireless terminal comprises a control plane radio bearer, and wherein a connection between the secondary network node and the wireless terminal comprises a user plane radio bearer.

5. The method of claim 4, wherein the connection between the primary network node and the wireless terminal further comprises a user plane radio bearer, and wherein the step of configuring the wireless terminal in the inactive mode is further based on inactivity of the user plane radio bearer in the connection between the primary network node and the wireless terminal.

6. The method of claim 1, further comprising:
receiving a message from the wireless terminal indicating that the wireless terminal wishes to enter an active mode; and
transmitting a message to the secondary network node indicating that the wireless terminal wishes to enter the active mode.

7. The method of claim 6, further comprising:
receiving a response message from the secondary network node indicating that the secondary network node has available resources for a connection to the wireless terminal; and
configuring the wireless terminal in an active mode with dual connection to the primary network node and the secondary network node.

8. The method of claim 6, further comprising:
receiving a response message from the secondary network node indicating that the secondary network node does not have available resources for a connection to the wireless terminal; and
configuring the wireless terminal in an active mode with connection only to the primary network node.

9. A network node for a telecommunications network, the network node operating as a primary network node for a wireless terminal configured with dual connectivity, the network node comprising processing circuitry and a non-transitory computer-readable medium storing instructions that, when executed by the processing circuitry, cause the network node to:
receive a message indicating that a secondary network node, which provides user plane connectivity for the wireless terminal, has no data to transmit to the wireless terminal; and
based at least in part on the received message, configure the wireless terminal in an inactive mode, wherein the instructions are configured to cause the network node to configure the wireless terminal in the inactive mode by:
maintaining an active connection for the wireless terminal between the network node and a core network of the telecommunications network; and
releasing resources for a connection between the network node and the wireless terminal.

10. The network node of claim 9, wherein a connection between the primary network node and the wireless terminal comprises a control plane radio bearer, and wherein a connection between the secondary network node and the wireless terminal comprises a user plane radio bearer.

11. The network node of claim 10, wherein the connection between the primary network node and the wireless terminal further comprises a user plane radio bearer, and wherein the network node is further configured to configure the wireless terminal in the inactive mode based on inactivity of the user plane radio bearer in the connection between the primary network node and the wireless terminal.

* * * * *